Dec. 15, 1953  H. A. SCHMITT ET AL  2,662,378
ART OF SHORE PROTECTION
Filed Aug. 6, 1949  2 Sheets-Sheet 1
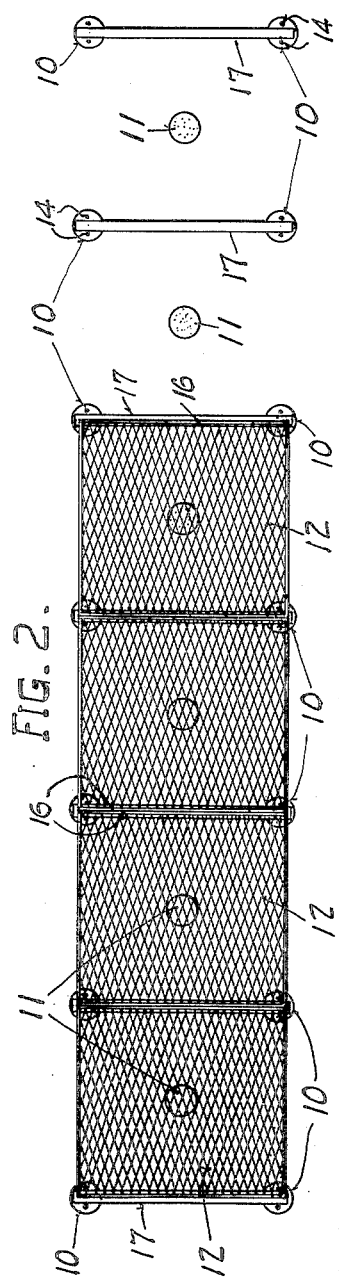
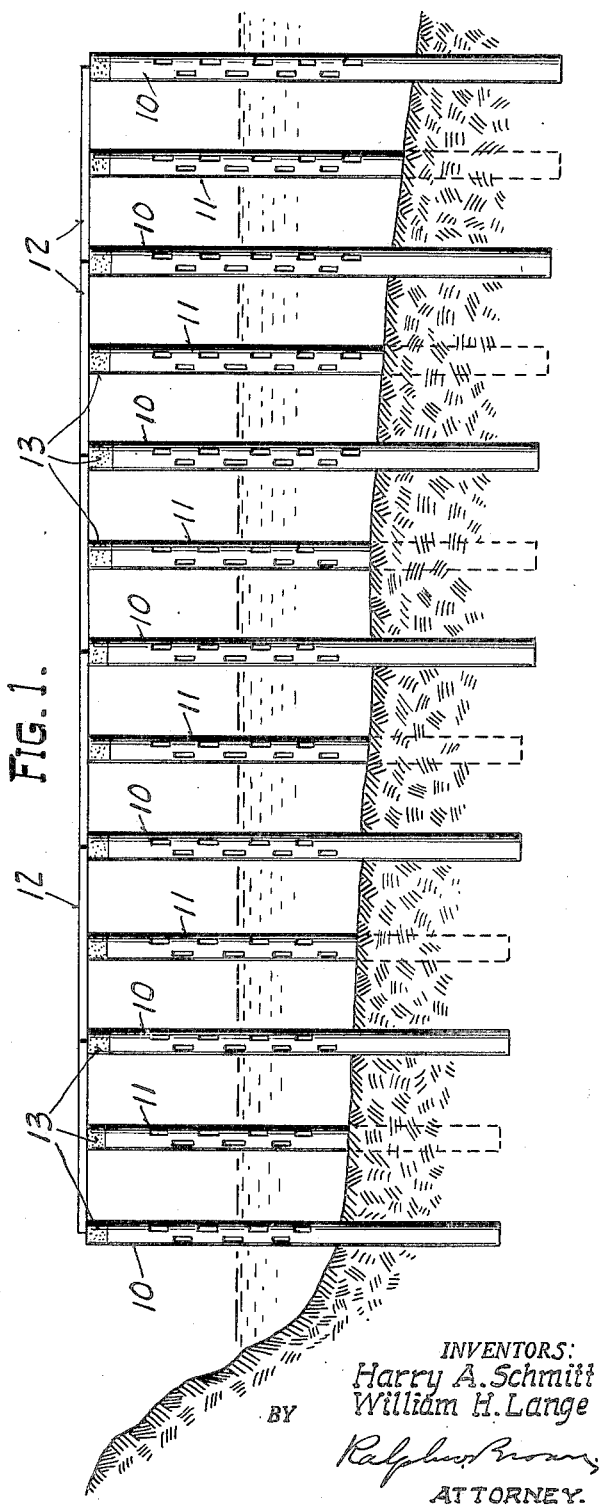
INVENTORS:
Harry A. Schmitt
William H. Lange
BY
ATTORNEY.

Dec. 15, 1953 H. A. SCHMITT ET AL 2,662,378
ART OF SHORE PROTECTION
Filed Aug. 6, 1949 2 Sheets-Sheet 2
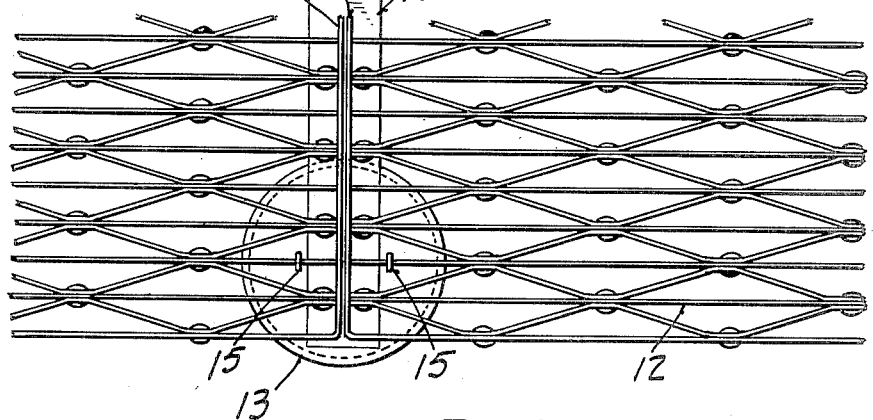
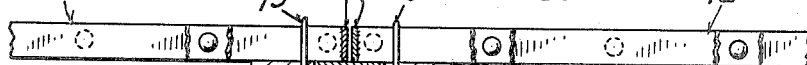
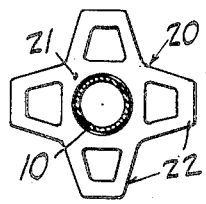
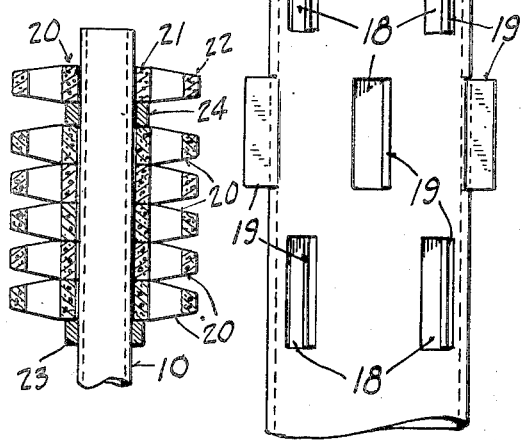
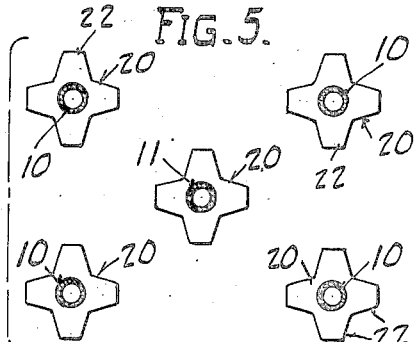
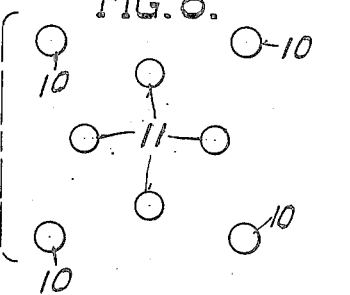
INVENTORS:
Harry A. Schmitt
BY William H. Lange
ATTORNEY Patented Dec. 15, 1953

2,662,378

UNITED STATES PATENT OFFICE 2,662,378

ART OF SHORE PROTECTION

Harry A. Schmitt, Shorewood, and William H. Lange, Milwaukee, Wis.

Application August 6, 1949, Serial No. 108,918

3 Claims. (Cl. 61—4)

This invention relates to the art of shore protection.

It is well recognized that a wide gradually sloping beach is the most effective permanent safeguard against destructive erosion along the shores of large bodies of water such as the Great Lakes. Solid retainer walls are ordinarily short lived not alone because of the terriffic pounding to which they are subjected during heavy seas but also because of the scouring action and undercutting that commonly occurs.

The development of a truly protective beach however presents innumerable problems and difficulties. Solid jetties, groins or sea walls extended seaward from the shore have proven ineffectual as beach builders. Although some accumulation of beach building materials commonly occurs on the weather side of such structures serious scouring ordinarily occurs on the leeward side and around the outer ends thereof. It would appear that structures designed to abruptly arrest the action of the waves and of the littoral currents at one point actually intensify the scouring action at another point thereby rendering such structures futile as a beach building medium.

One object of the present invention is to provide an improved jetty capable of dissipating the energy of the waves and of damping the littoral currents to a degree such that the sand content of the water, thus stilled, will settle out and provide a beach building deposit in and about both sides of the jetty. We have discovered that a jetty composed of a series of upright piles of substantial size and suitably spaced and arranged are particularly well adapted for these purposes, the particular size and arrangement for any particular installation being dependent upon the prevailing conditions encountered.

Another object of the invention is to provide an improved beach-building jetty capable of erection at minimum cost.

Other more specific objects and advantages will appear, expressed or implied, from the following description of a jetty embodying the present invention.

In the accompanying drawings:

Figure 1 is a view in side elevation of a jetty constructed in accordance with this invention.

Fig. 2 is a top plan view of a partially completed jetty of the type shown in Fig. 1.

Figs. 3 and 4 are fragmentary views in plan and section, respectively, showing preferred structural details.

Fig. 5 is a schematic view in plan illustrating the use of damping lugs on the several piles shown in Fig. 1.

Figs. 6 and 7 are horizontal and sectional views, respectively, showing the lugs of Fig. 5 in greater detail.

Fig. 8 is a schematic view showing an arrangement of piles somewhat different from that indicated in Figs. 2 and 5.

The jetty shown in Figs. 1 and 2 comprises two parallel rows of spaced piles 10, constituting the sides of the jetty and hereinafter referred to as the "outer" piles, and an intermediate row of piles 11, hereinafter referred to as the "inner" piles. For a purpose to be later described the inner piles 11 are arranged in staggered relation with respect to the outer piles.

The several piles 10 and 11 extend to a uniform height somewhat above the water level and support a suitable horizontal rigid decking 12 through which they are securely interconnected. The decking 12 is preferably of sufficient width and strength to support the heavy mechanical equipment, such as the pile handling and driving equipment, used in erecting the jetty, and the decking is preferably laid in sections permitting this equipment to travel outwardly along the jetty as the erection proceeds seaward. It is thus possible to avoid the use of water-borne erection equipment and the heavy expenses ordinarily involved in such use.

In this instance the decking 12, shown in detail in Figs. 3 and 4, is preferably of steel and of an open mesh or grille type, such as is commonly used in modern bridges.

The several piles 10 and 11 are preferably of hollow steel construction, each being equipped with a suitable cap 13 preferably of concrete molded into the head end of the pile after the latter has been driven into place. Rods 14 embedded in and projecting upwardly from each cap 13 may be clinched to the decking, as indicated at 15, to provide secure anchorage for the latter. The abutting ends 16 of successive deck sections are preferably supported on suitable underlying transverse beams or bents 17, whose opposite ends are embedded in the caps 13 of the outer piles 10.

In the jetty shown, the several piles 10 and 11 are relied upon to dissipate the force of the waves and to damp the littoral currents so that the matter in suspension may be released and deposited as beach building material. That is the purpose of the staggered pile arrangement shown in which the maximum clear gap between piles is not in excess of about four feet. That is to say, with the two rows of outer piles 10 arranged seven feet apart, measured from center to center, to provide a deck width sufficient to support the erecting equipment, with the outer piles of each row similarly spaced, and with the inner piles 11 disposed midway between the outer piles 10, the actual distance between any outer pile and an adjacent inner pile is equal to the center distance of less than five feet minus a pile diameter of from ten to sixteen inches. This is the maximum clear space when the wave motion is at an angle of forty-five degrees to the jetty. The effective clear gap is always measured parallel to the wave front, so that with the waves traveling at any angle other than forty-five degrees, the effective clear gap is actually less than the measured distance between those piles.

In order to increase the damping action of the individual piles, each is preferably perforated to provide a series of openings, as indicated at 18 in Fig. 4. This series of openings preferably extend well above and below the water level so as to permit the water to flow into and out of each pile and to dissipate its energy in that manner. The openings 18 may be formed by complete removal of material from the pile, or by merely displacing the material in a manner to provide baffles, such as indicated at 19.

Another method of increasing the damping effect of individual piles is illustrated in Figs. 5, 6 and 7. As therein indicated a series of baffling lugs 20 are mounted in column formation on each pile. Although these lugs may be of any suitable material, such as cast or stamped metal, those shown are of concrete. Each comprises a central hollow hub portion 21, adapted to be loosely threaded onto a pile, and a plurality of radial projections or wings 22. Each column or stack of lugs may rest on the bottom or bed of the lake or on a suitable supporting collar 23 attached to the pile, but in any event each column preferably extends substantially above the water level. Each of the lugs 20 are preferably free to turn about the pile as the action of the water may dictate, and for that purpose the hub 21 of each is preferably deeper or of greater thickness than the projections 22, so as to reduce the area of contact between successive lugs. Under some conditions the best results may be obtained when the lugs 20 of a column are spaced apart by suitable collars or sleeves such as indicated at 24 in Fig. 7. Although preferably made in one piece and applied by threading the same onto the pile, the lugs may be made in sections releasably joined to permit ready removal from the pile.

The inner piles 11 may be variously arranged to best meet the particular conditions encountered in a given installation. For instance, instead of arranging the inner piles in the single row shown in Fig. 2, they may be arranged in two or more rows or in groups as indicated in Fig. 8. Such an arrangement would, for instance, permit the use of a wider deck 12 and at the same time provide a maximum clear gap between piles of not more than about four feet.

Various other changes may be made in the invention hereinabove specifically described without departing from or sacrificing the advantages of the invention as defined in the appended claims.

We claim:

1. A beach building jetty comprising a longitudinal series of inner and outer piles disposed in staggered relation, at least some of said piles comprising hollow steel structures having openings extending therethrough above and below the water level, said openings forming means for dissipating the force of the waves to damp the littoral currents whereby matter suspended in the water is released, and a substantially flat deck overlying and supported by said piles.

2. A beach building jetty comprising a longitudinal series of hollow steel piles having side openings therein extending above and below the water level, said side openings forming means for dissipating the force of the waves to damp the littoral currents whereby matter suspended in the water is released, and means interconnecting said piles.

3. A beach building jetty comprising a longitudinal series of spaced hollow steel piles having side openings therein extending above and below the water level and having projecting baffles adjacent said openings, said side openings and projecting baffles forming means for dissipating the force of the waves to damp the littoral currents whereby matter suspended in the water is released, and means interconnecting said piles.

HARRY A. SCHMITT.
WILLIAM H. LANGE.

References Cited in the file of this patent

UNITED STATES PATENTS

| Number | Name | Date |
| --- | --- | --- |
| 226,237 | Maclay | Apr. 6, 1880 |
| 1,385,166 | Bagnall | July 19, 1921 |
| 2,387,965 | Wood | Oct. 30, 1945 |
| 2,474,786 | Humphrey | June 28, 1949 |
| 2,514,119 | Boccia | July 4, 1950 |